United States Patent
Li et al.

(10) Patent No.: US 11,505,252 B2
(45) Date of Patent: Nov. 22, 2022

(54) INTERIOR STRUCTURE FOR AN AUTOMATED VEHICLE

(71) Applicant: Honda Motor Co., Ltd., Tokyo (JP)

(72) Inventors: Yuze Li, Troy, MI (US); Akira Miyazaki, Birmingham, MI (US); Carlington G. Demetrius, Dublin, OH (US); Yuichiro Umeda, Novi, MI (US)

(73) Assignee: HONDA MOTOR CO., LTD., Tokyo (JP)

( * ) Notice: Subject to any disclaimer, the term of this patent is extended or adjusted under 35 U.S.C. 154(b) by 101 days.

(21) Appl. No.: 17/178,583

(22) Filed: Feb. 18, 2021

(65) Prior Publication Data

US 2022/0258803 A1    Aug. 18, 2022

(51) Int. Cl.
| | |
|---|---|
| *B60J 7/00* | (2006.01) |
| *B62D 21/15* | (2006.01) |
| *B62D 25/20* | (2006.01) |
| *B60R 5/04* | (2006.01) |
| *B60R 11/00* | (2006.01) |

(52) U.S. Cl.
CPC ............. *B62D 21/152* (2013.01); *B60R 5/04* (2013.01); *B62D 25/2027* (2013.01); *B62D 25/2036* (2013.01); *B62D 25/2045* (2013.01); *B60R 11/00* (2013.01)

(58) Field of Classification Search
CPC ... G07F 19/20; G07F 19/205; H01L 2924/00; G02F 1/13452; G06Q 20/1085; F16H 61/0248; F16H 61/702; B60W 10/06; H04M 7/006; B60R 16/0315
See application file for complete search history.

(56) References Cited

U.S. PATENT DOCUMENTS

| | | | |
|---|---|---|---|
| 5,267,772 A | 12/1993 | Ohta et al. | |
| 5,419,609 A * | 5/1995 | Kmiec | B62D 43/04 296/187.11 |
| 5,669,537 A * | 9/1997 | Saleem | B60R 7/02 224/42.32 |
| 5,890,758 A * | 4/1999 | Pone | B60N 2/3065 297/15 |

(Continued)

FOREIGN PATENT DOCUMENTS

| | | |
|---|---|---|
| CN | 208593346 | 3/2019 |
| DE | 102017128064 | 5/2019 |

(Continued)

*Primary Examiner* — Kiran B Patel
(74) *Attorney, Agent, or Firm* — Rankin, Hill & Clark LLP

(57) ABSTRACT

An automated vehicle includes a vehicle body defining a storage area located rearward of a rearmost vehicle seat in a front-rear direction of the automated vehicle. An interior structure is located in the storage area. The interior structure defines a storage compartment for housing an electronic component of the automated vehicle. The interior structure includes a removable floor panel overlying the storage compartment and a wall panel extended upward from the floor panel in a height direction of the automated vehicle. The storage compartment includes a dedicated space for the electronic component, the dedicated space located forward of a forward edge portion of the floor panel in the front-rear direction and between the wall panel and the rearmost vehicle seat in the front-rear direction.

20 Claims, 4 Drawing Sheets

(56) References Cited

U.S. PATENT DOCUMENTS

| | | | | |
|---|---|---|---|---|
| 5,975,612 | A | * | 11/1999 | Macey ................. B60N 2/3093 296/65.13 |
| 6,039,378 | A | * | 3/2000 | Bailey .................... B60R 5/045 296/37.16 |
| 6,273,487 | B1 | * | 8/2001 | Schurig ................. E05F 15/627 296/76 |
| 6,811,196 | B2 | * | 11/2004 | Gammon ................. B60R 7/08 296/37.16 |
| 7,090,274 | B1 | * | 8/2006 | Khan ....................... B60N 2/36 296/37.16 |
| 8,708,402 | B2 | | 4/2014 | Saeki |
| 9,010,831 | B2 | | 4/2015 | Gaudig et al. |
| 9,132,778 | B2 | | 9/2015 | Yoshizawa et al. |
| 9,714,052 | B2 | | 7/2017 | Matsuoka et al. |
| 10,688,856 | B2 | | 6/2020 | Kasai et al. |
| 2004/0135390 | A1 | * | 7/2004 | Gammon ................. B60R 7/08 296/37.1 |
| 2018/0015882 | A1 | * | 1/2018 | Kim .......................... B60R 5/04 |
| 2019/0210502 | A1 | * | 7/2019 | Fulton .................... B60J 5/101 |
| 2021/0188180 | A1 | * | 6/2021 | Reyes Marcial ......... B60R 7/02 |

FOREIGN PATENT DOCUMENTS

| | | |
|---|---|---|
| JP | 2008037299 | 2/2008 |
| JP | 4544021 | 9/2010 |
| WO | 2016001510 | 1/2016 |

* cited by examiner

INTERIOR STRUCTURE FOR AN AUTOMATED VEHICLE

BACKGROUND

Automated vehicles are typically provided with storage compartments of some type for housing associated electrical components, such as an automated driving computer system. The storage compartment can be located behind the last row of seating and is generally covered by a removable floor panel to provide easy access to the electrical components and to allow for the placement of other items to be carried within a cargo storage area of the automated vehicle. Because the cargo storage area may be somewhat limited within the automated vehicle, the efficiency and utilization of the storage compartment should be maximized without intruding on passenger space. In addition, with the location of a rearward storage compartment, the electrical components should be protected from damage in the event of a vehicle rear-end collision.

BRIEF DESCRIPTION

According to one aspect, an automated vehicle comprises a vehicle body defining a storage area located rearward of a rearmost vehicle seat in a front-rear direction of the automated vehicle. An interior structure is located in the storage area. The interior structure defines a storage compartment for housing an electronic component of the automated vehicle. The interior structure includes a removable floor panel overlying the storage compartment and a wall panel extended upward from the floor panel in a height direction of the automated vehicle. The storage compartment includes a dedicated space for the electronic component, the dedicated space located forward of a forward edge portion of the floor panel in the front-rear direction and between the wall panel and the rearmost vehicle seat in the front-rear direction.

According to another aspect, an interior structure for an automated vehicle including an automated driving computer system is provided. The interior structure comprises a floor panel and a wall panel extended upwardly from the floor panel in a height direction of the automated vehicle. The floor panel and the wall panel define a storage compartment for housing the automated driving computer system. The floor panel overlies the storage compartment when in a closed position and permits access to the storage compartment when in an open position. A first support bracket extended in a width direction of the automated vehicle is configured to have releasably mounted thereto both a forward edge portion of the floor panel in a front-rear direction of the automated vehicle and a lower edge portion of the wall panel in the height direction of the automated vehicle. A second support bracket extended in the front-rear direction is configured for having releasably mounted thereto a lateral edge portion of the floor panel in the width direction. A first connecting feature depends from the lateral edge portion of the floor panel, and the second support bracket includes a second connecting feature that directly cooperates with the first connecting feature via movement of the floor panel in the front-rear direction.

According to another aspect, an automated vehicle comprises a vehicle body defining a storage area located rearward of a rearmost vehicle seat in a front-rear direction of the automated vehicle. An interior structure located in the storage area defines a storage compartment for housing an electronic component of the automated vehicle. The interior structure includes a removable floor panel overlying the storage compartment and a wall panel extended upward from the floor panel in a height direction of the automated vehicle. The storage compartment includes a dedicated space for the electronic component, the dedicated space located between the wall panel and the rearmost vehicle seat in the front-rear direction. A lower surface of the floor panel includes a deformation feature defined by a pair of laterally spaced channels integrally formed in the lower surface for causing an intended deformation of the floor panel in the front-rear direction in the event of a rear-end collision so as to absorb impact energy of the rear-end collision applied to the vehicle body to prevent damage to the electronic component.

DETAILED DESCRIPTION

Figure 1:
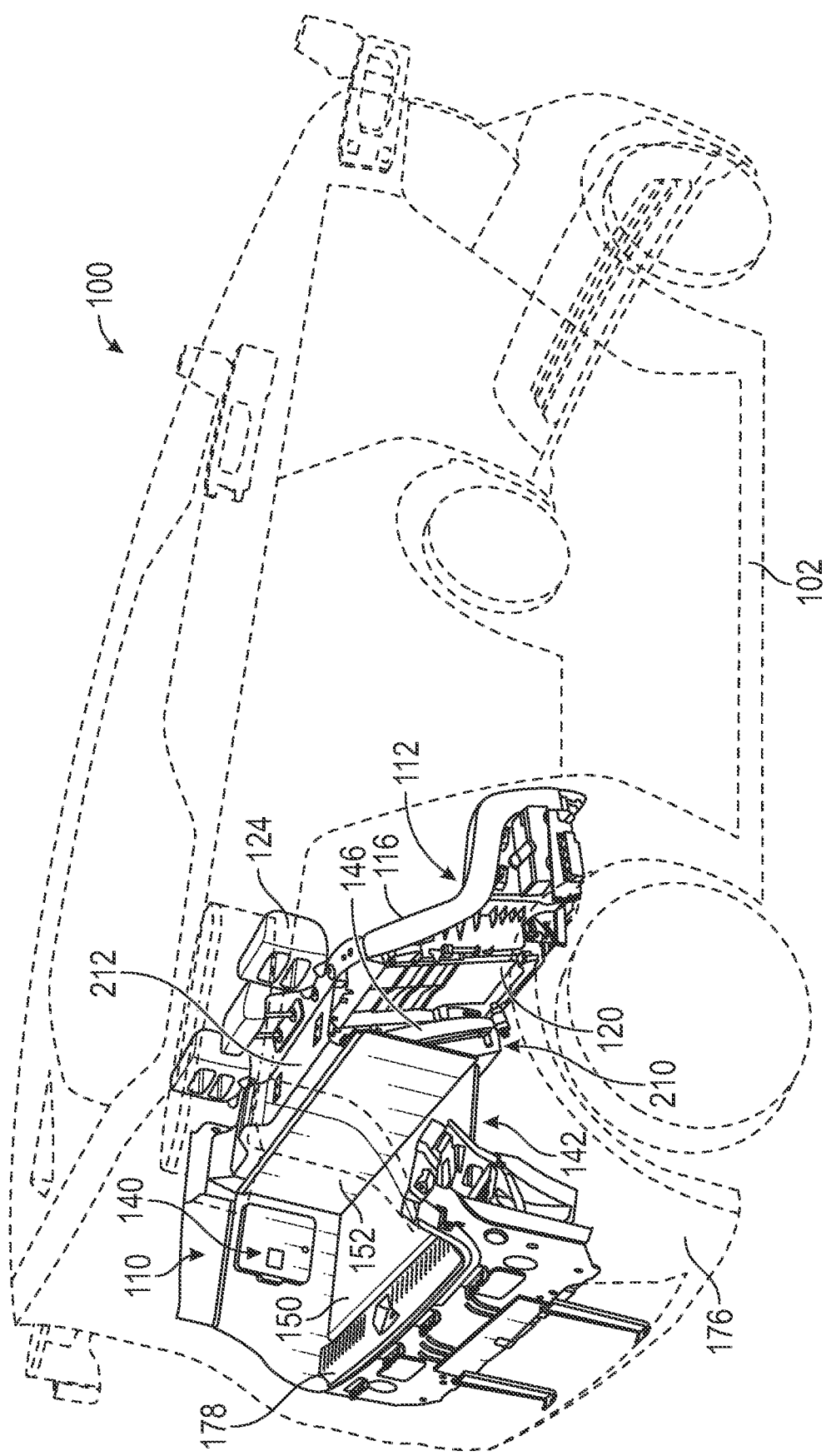
FIG. 1 is a schematic side perspective view of an interior structure for an automated vehicle according to the present disclosure.

It should, of course, be understood that the description and drawings herein are merely illustrative and that various modifications and changes can be made in the structures disclosed without departing from the present disclosure. Referring now to the drawings, wherein like numerals refer to like parts throughout the several views, FIG. 1 schematically illustrates an automated vehicle 100 comprising a vehicle body 102. In this example embodiment, the term "vehicle body" is used generically, and should be interpreted to include structural components of the vehicle 100, such as a frame, a floor, a roof, door, exterior panels, interior panels, and the like. The vehicle body 102 extends in a front-rear (longitudinal) direction, a left-right (width) direction, and an up-down (height or vertical) direction of the vehicle 100. The vehicle body 102 defines a rear storage area 110 located rearward of a rearmost vehicle seat 112 in the front-rear direction. The storage area 110 can be accessible, for example, via a rear hatchback or tailgate door, as is known in the relevant art. The vehicle seat 112 includes a seat back 116 connected to a seat base 118. The term "seat back" is used generically, and should be interpreted to include structural components of the seat back 116, including a frame 120, an optional cushion 122 and/or an optional headrest(s) 124. Similarly, the term "seat base" is used generically, and should be interpreted to include structural components of the seat base 118, including a frame (not visible), operator controls, and an optional cushion 130.

Figure 2:
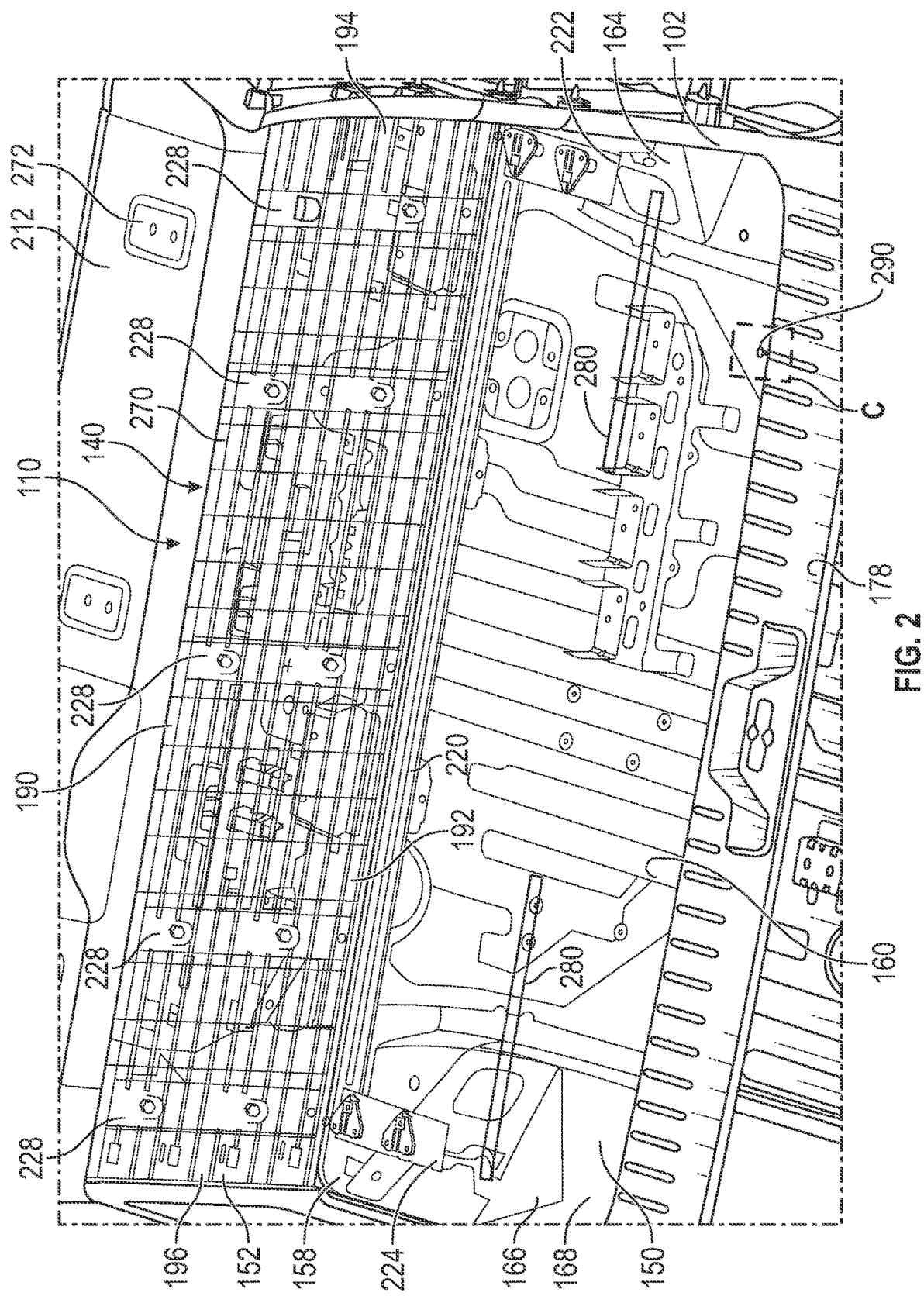
FIG. 2 is a partial top perspective view of FIG. 1 with a floor panel and a wall panel of the interior structure view transparent to show underlying features.
Figure 3:
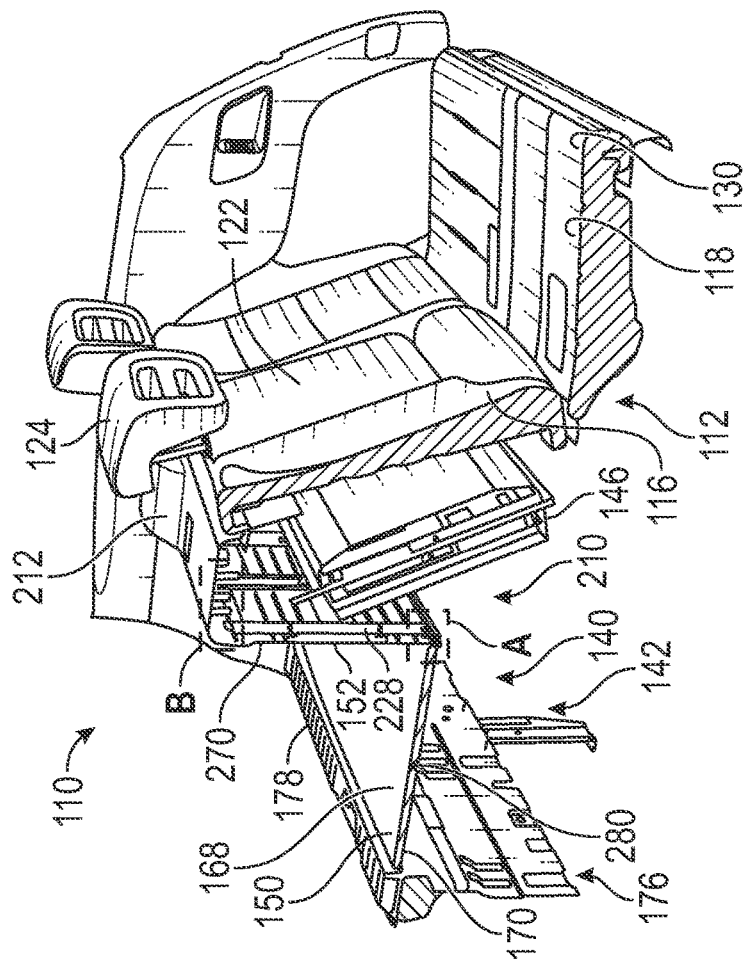
FIG. 3 is a partial side cross-sectional perspective view of FIG. 1.

With reference to FIGS. 1-3, an interior structure 140 of the automated vehicle is located in the storage area 110, the interior structure defining a storage compartment 142 for housing an electronic component 146 of the automated vehicle 100. In the depicted aspect, the electronic component 146 is an automated driving computer system (referred to hereinafter by acronym ADSC 146). The ADSC 146 is a controller for various electronically implemented vehicle systems, and may take the form of any control unit configured to control the various vehicle systems. For example, the ADSC 146 may include a processor which executes software implemented functions to control operation of the vehicle, and may include control modules associated with the processor. The interior structure 140 of the present disclosure includes a removable floor panel 150 and a wall panel 152. The floor panel 150 is sized to overlie the storage compartment 142 when in a closed position and permits access to the storage compartment when in an open position. The floor panel 150 includes forward and rear edge portions 158, 160 in the front-rear direction and lateral edge portions 162, 164 in the width direction. The floor panel 150 further includes an exterior surface 168, which is a supporting surface for cargo placed in the storage area 110, and an interior, lower surface 170. The rear edge portion 160 is supported by frame components 176 adjacent to step plate 178. The wall panel 152 is extended upward from the forward edge portion 158 in the height direction. The wall panel 152 includes upper and lower edge portions 190, 192 in the height direction and lateral edge portions 194, 196 in the width direction. The upper edge portion 190 interfaces with the seat back 116, and the lower edge portion 192 interfaces with the floor panel 150. The wall panel 152 further includes an exterior surface 200 facing the storage area 110 and an interior surface 202.

The storage compartment 142, again covered by the floor panel 150 and the wall panel 152, includes a dedicated space 210 for the ADSC 146. As best depicted in FIGS. 1 and 3, the dedicated space 210 is located forward of the forward edge portion 158 of the floor panel 150 in the front-rear direction and between the wall panel 152 and the frame 120 of the vehicle seat 112 in the front-rear direction. An upper cap 212 provided as an uppermost part of the seat back 116 in the height direction covers that portion of the dedicated space between the wall panel 152 and the frame 120. Therefore, by locating the ADSC 146 in the dedicated space 210, the ADSC 146 is separated and protected within the storage compartment 142 from other associated stored items.

Figure 4:
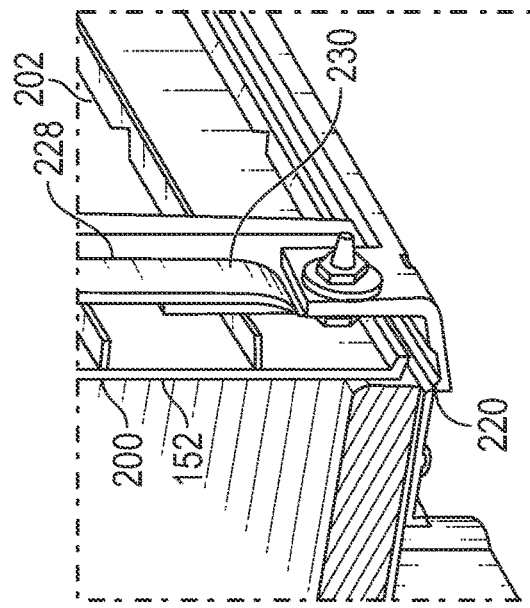
FIG. 4 is an enlarged view of detail A of FIG. 3.

To support the floor panel 150 and the wall panel 152 within the storage area 110, the interior structure 140 includes a first support bracket 220 and second support brackets 222, 224. In FIGS. 2 and 4, the first support bracket 220 is extended in the width direction beneath the floor panel 150 is configured to have releasably mounted thereto both the forward edge portion 158 of the floor panel and the lower edge portion 192 of the wall panel 152. According to one aspect, the forward edge portion 158 can be directly fastened to the first support bracket, and the lower edge portion 192 is connected to the first support bracket 220 via at least one frame member 228 provided as part of the wall panel 152. In the present embodiment, the at least one frame member 228 is a plurality of frame members extended in the height direction and spaced from one another in the width direction. The frame members 228 support the interior surface 202 of the wall panel 152 and have lower end portions releasably fastened to the first support bracket 220.

Figure 6:
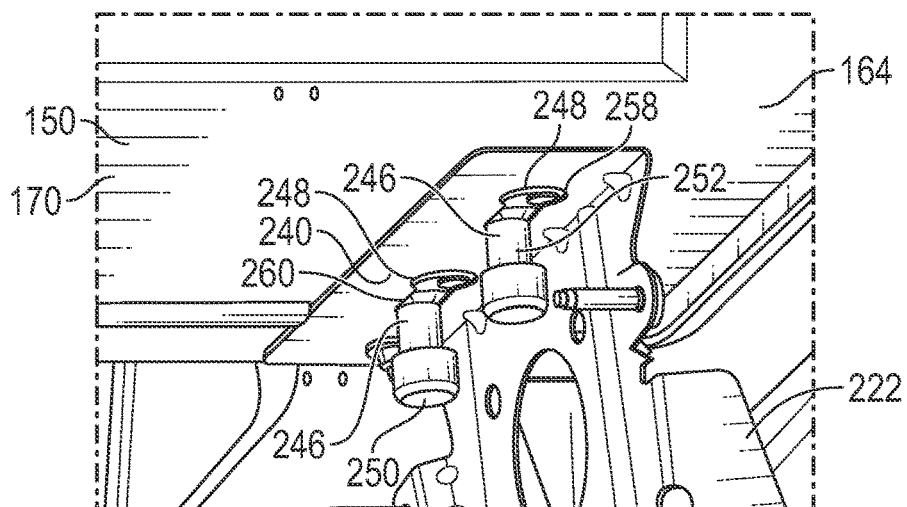
FIG. 6 is a partial perspective view of a lower surface of the floor panel of FIG. 2 including an underlying support bracket.

The second support brackets 222, 224 are extended in the front-rear direction and configured for having releasably mounted thereto the respective lateral edge portions 164, 166 of the floor panel 150. To this end, a first connecting feature depends from each lateral edge portion of the floor panel, and each second support bracket includes a second connecting feature that directly cooperates with and is releasably engaged by the first connecting feature via a movement of the floor panel 150 in the front-rear direction. More particularly, FIG. 6 depicts the lateral edge portion 164 connected to the second support bracket 222, the lateral edge portion 166 being similarly connected with the second support bracket 226. The second support bracket 222 includes a bracket body 136 attached to the vehicle body 102 and having a horizontal platform 240 for supporting the lateral edge portion 164. The first connecting feature is at least one pin 246 depending from the lateral edge portion 164, and the second connecting feature is at least one slot 248 elongated in the front-rear direction on the horizontal platform 240 that slidably receives the at least one pin 246. As shown, the at least one pin 246 includes a post 250 having an enlarged head 252. The at least one slot 248 is defined by a first opening section 258 sized to receive the entirety of the at least one pin 246 and a second opening section 260 forward of the first opening direction sized to slidably receive only the post. Therefore, with this arrangement, to connect the floor panel 150 to the second support brackets 222, 224, the at least one pins 246 depending from the lateral edge portions 164, 166 are first inserted into the first opening sections 258 of the at least one slots 248, and then the floor panel is moved forward relative to the second support brackets 222, 224 which move the at least one pins 246 into the second opening sections 266 of the at least one slots 248. It should be appreciated that the pin/slot arrangement can be reversed with the at least one slot 248 defined in the lateral edge portion 164 and the at least one pin 246 extended from the horizontal platform 240.

Figure 5:
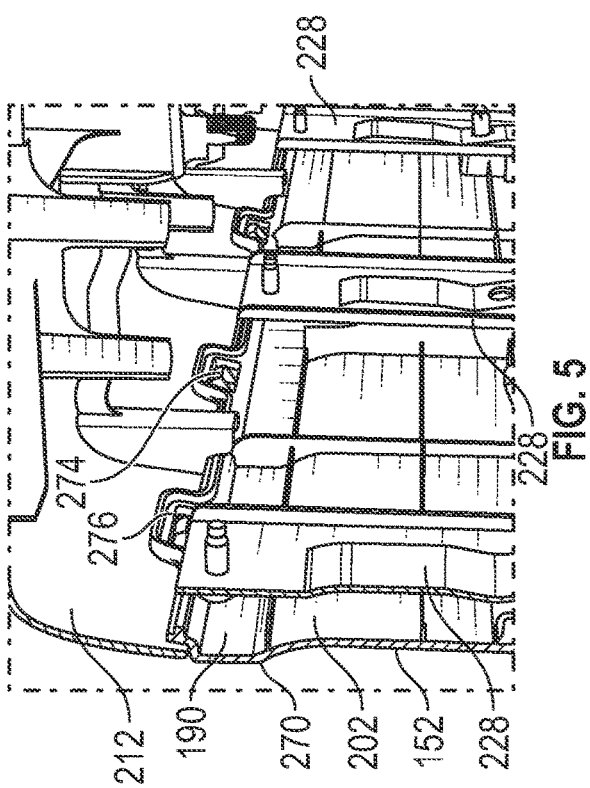
FIG. 5 is an enlarged view of detail B of FIG. 3.

As indicated above, the interior surface 202 of the wall panel 152 is supported by the frame members 228, and lower end portions 230 of the frame members releasably connected to the first support bracket 220 (FIG. 4). In FIGS. 3 and 5, the wall panel 152 together with the frame members 228 define a rear outer panel 270 of the rearmost vehicle seat 112 of the automated vehicle 100, thereby sufficiently locating the dedicated space 210 for the ADSC 146 within the seat back 116. Therefore, the upper cap is extended to the wall panel 152 to maintain a conventional appearance of the vehicle seat 112, and can be provided with child seat anchors covered by covers 272 (FIGS. 1-3). As shown, the upper edge portion 190 of the wall panel 152 in the height direction is releasably connected to the upper cap 212, for example, by tabs 274 extended from the upper cap 212 being received in mounting openings 276 in the upper edge portion 190.

Figure 7:
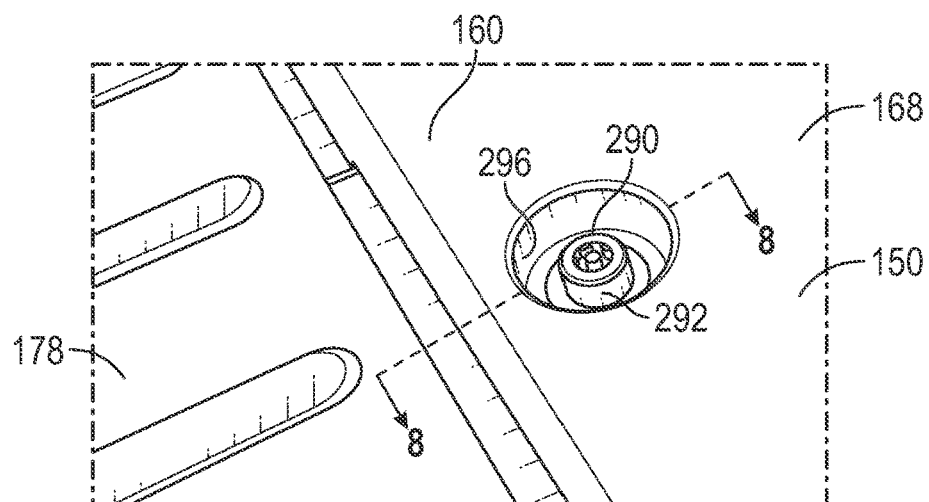
FIG. 7 is an enlarged view of detail C of FIG. 2
Figure 8:
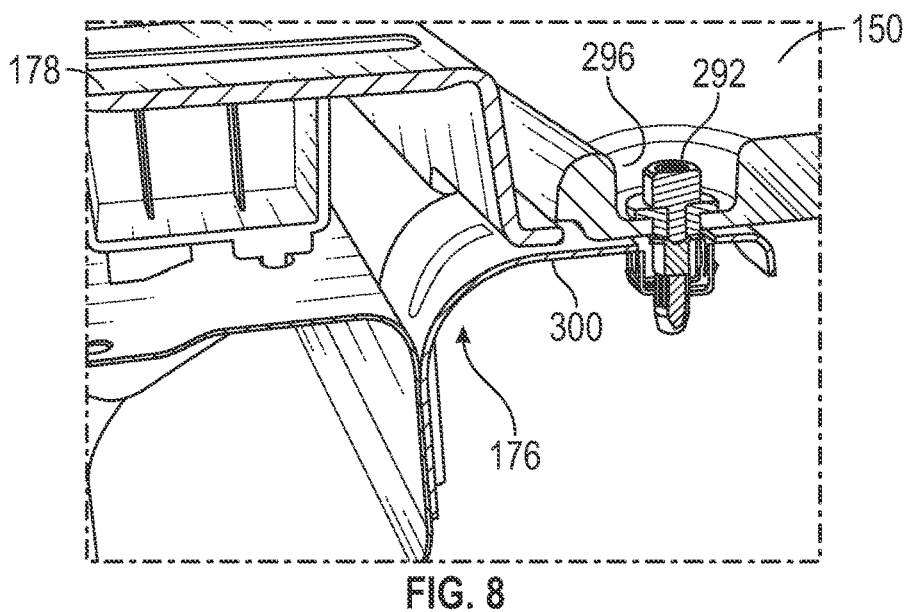
FIG. 8 is a cross-sectional view of FIG. 7 taken generally along line 8-8 of FIG. 7.

With reference to FIGS. 2 and 3, the lower surface 170 of the floor panel 150 includes a deformation feature integrally formed therein for causing an intended lengthwise deformation of the floor panel 150 (i.e., deformation of the floor panel in the front-rear direction) in the event of a rear-end collision so as to absorb impact energy of the rear-end collision applied to the vehicle body 102. In the present embodiment, the deformation feature is defined by a pair of laterally spaced channels or grooves 280 integrally formed in the lower surface 170, which allows the floor panel 150 to fold upwardly absorbing impact energy. This controlled deformation of the floor panel 150 is designed to absorb the impact energy, preventing damage to the wall panel 152 and the ADSC 146. Further, in FIGS. 2, 7 and 8, the rearward edge portion 160 of the floor panel 150 in the front-rear direction includes a locking feature 290 having a tamper-proof fastener or bolt 292 adapted to require a specialized tool for removal. The fastener 292 is received in an offset portion 296 defined in the floor panel 150 to secure the floor panel to an underlying rear support 300 of the frame components 176 of the vehicle body 102. The floor panel 150 cannot be removed without first removing the fastener 292.

Accordingly, with the present disclosure, the ADSC 146 of the automated vehicle 100 is located in the dedicated space 210 immediately behind the rearmost vehicle seat 112 and is covered and protected by the interior structure 140, namely the floor panel 150 and the wall panel 152. During normal operation/use of the automated vehicle 100, the floor and wall panels 150, 152 of the interior structure 140 remain fixed in the orientations shown and are typically intended for removal when access to the ADSC 146 is needed (for servicing for example).

The floor panel 150 includes the above described features for limiting the removal of the floor panel. As illustrated, the features include the pin/slot arrangement at the forward edge portion 158 of the floor panel 150 for securing the floor panel to the underlying second support brackets 222, 224. As shown, each pin 246 extending from the lower surface 170 of the floor panel 150 includes the relatively narrow diameter post 250 leading to the relatively wide diameter head 252. Each of the slots 248 in the second support brackets 222, 224 includes the widened first opening section 258 configured for receipt of the head 252 and the relatively narrow second opening section 260 for sliding/locked receipt of the post 250. The features further include the tamperproof bolt 292 received by the floor panel 150 along the rear edge portion 160 to secure the floor panel to the underlying rear support 300. The tamperproof bolt 292 includes head features that prevent the application of a removal torque to the bolt head absent a specialized tool. As should be understood, removal of the tamperproof bolt 292 allows for rearward translation of the floor panel 150 (and the attached pins 246) followed by an upward removal of the floor panel via the enlarged first opening section 258 of the slots 248. With the floor panel removed, the ADSC 146 can be serviced.

The interior structure 140 also includes features for protecting the ADSC 146 against damage from a collision event. As illustrated, the floor panel 150 includes the channels or grooves 280 integrally formed in the lower surface 170. The channels 280 are configured to weaken the floor panel and define break/deformation lines for failure of the floor panel 150 in response to a longitudinally impact load applied to the floor panel (i.e., to limit transmission of impact load to the ADSC during a rear collision). In addition, the vertical wall panel includes the spaced frame members 228 reinforcing the wall panel 152 against deformation.

It will be appreciated that the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. An automated vehicle comprising:
    a vehicle body defining a storage area located rearward of a rearmost vehicle seat in a front-rear direction of the automated vehicle;
    an interior structure located in the storage area, the interior structure defining a storage compartment for housing an electronic component of the automated vehicle, the interior structure including a removable floor panel overlying the storage compartment and a wall panel extended upward from the floor panel in a height direction of the automated vehicle; and
    wherein the storage compartment includes a dedicated space for the electronic component, the dedicated space located forward of a forward edge portion of the floor panel in the front-rear direction and between the wall panel and the rearmost vehicle seat in the front-rear direction.

2. The automated vehicle of claim 1, wherein the electronic component is an automated driving computer system.

3. The automated vehicle of claim 1, including a first support bracket extended in a width direction of the automated vehicle beneath the floor panel, the first support bracket configured for having releasably mounted thereto both the forward edge portion of the floor panel and a lower edge portion of the wall panel in the height direction.

4. The automated vehicle of claim 3, wherein an interior surface of the wall panel is supported by a plurality of frame members extended in the height direction and spaced from one another in the width direction, the plurality of frame members releasably connected to the first support bracket.

5. The automated vehicle of claim 4, wherein the wall panel together with the frame members define a rear outer panel of the rearmost vehicle seat.

6. The automated vehicle of claim 5, wherein the rearmost vehicle seat includes an upper cap provided as an uppermost part of a seat back in the height direction, an upper edge portion of the wall panel in the height direction releasably connected to the upper cap.

7. The automated vehicle of claim 3, including a second support bracket mounted to the vehicle body for supporting the floor panel, the second support bracket extended in the front-rear direction and configured for having releasably mounted thereto a lateral edge portion of the floor panel in the width direction.

8. The automated vehicle of claim 7, wherein the lateral edge portion of the floor panel includes a first connecting feature and the second support bracket includes a second connecting feature adapted for releasable engagement with the first connecting feature.

9. The automated vehicle of claim 8, wherein the first connecting feature is a pin depending from the floor panel, and the second connecting feature is a slot elongated in the front-rear direction that slidably receives the pin.

10. The automated vehicle of claim 1, wherein a lower surface of the floor panel includes a deformation feature integrally formed therein for causing an intended lengthwise deformation of the floor panel in the event of a rear-end collision so as to absorb impact energy of the rear-end collision applied to the vehicle body.

11. The automated vehicle of claim 10, wherein the deformation feature is defined by a pair of laterally spaced channels integrally formed in the lower surface.

12. The automated vehicle of claim 1, wherein a rearward edge portion of the floor panel in the front-rear direction includes a locking feature having a tamperproof fastener to secure the floor panel to an underlying rear support of the vehicle body.

13. An interior structure for an automated vehicle including an automated driving computer system, the interior structure comprising:
    a floor panel and a wall panel extended upwardly from the floor panel in a height direction of the automated vehicle, the floor panel and the wall panel defining a storage compartment for housing the automated driving computer system, wherein the floor panel overlies the storage compartment when in a closed position and permits access to the storage compartment when in an open position;

a first support bracket extended in a width direction of the automated vehicle and configured to have releasably mounted thereto both a forward edge portion of the floor panel in a front-rear direction of the automated vehicle and a lower edge portion of the wall panel in the height direction of the automated vehicle; and a second support bracket extended in the front-rear direction and configured for having releasably mounted thereto a lateral edge portion of the floor panel in the width direction, wherein a first connecting feature depends from the lateral edge portion of the floor panel, and the second support bracket includes a second connecting feature that directly cooperates with the first connecting feature via movement of the floor panel in the front-rear direction.

14. The interior structure of claim 13, wherein the first connecting feature is a pin depending from the lateral edge portion of the floor panel, and the second connecting feature is a slot elongated in the front-rear direction on a horizontal platform of the second support that slidably receives the pin.

15. The interior structure of claim 13, wherein a rearward edge portion of the floor panel in the front-rear direction includes a locking feature having a tamperproof fastener to secure the floor panel to an underlying rear support of the interior structure.

16. The interior structure of claim 13, wherein a lower surface of the floor panel includes a deformation feature integrally formed therein for causing an intended lengthwise deformation of the floor panel in the event of a rear-end collision.

17. The interior structure of claim 16, wherein the deformation feature is defined by a pair of laterally spaced channels integrally formed in the lower surface, the channels aligned in the front-rear direction.

18. The interior structure of claim 13, wherein an interior surface of the wall panel is supported by a plurality of frame members, the frame members configured to be releasably connected to the first support bracket, the wall panel together with the frame member define a rear outer panel of a rearmost vehicle seat of the automated vehicle.

19. An automated vehicle comprising:

a vehicle body defining a storage area located rearward of a rearmost vehicle seat in a front-rear direction of the automated vehicle; and an interior structure located in the storage area, the interior structure defining a storage compartment for housing an electronic component of the automated vehicle, the interior structure including a removable floor panel overlying the storage compartment and a wall panel extended upward from the floor panel in a height direction of the automated vehicle;

wherein the storage compartment includes a dedicated space for the electronic component, the dedicated space located between the wall panel and the rearmost vehicle seat in the front-rear direction, wherein a lower surface of the floor panel includes a deformation feature defined by a pair of laterally spaced channels integrally formed in the lower surface for causing an intended deformation of the floor panel in the front-rear direction in the event of a rear-end collision so as to absorb impact energy of the rear-end collision applied to the vehicle body to prevent damage to the electronic component.

20. The automated vehicle of claim 19, wherein an interior surface of the wall panel is supported by at least one frame member, and the wall panel together with the at least one frame member define a rear outer panel of the rearmost vehicle seat of the automated vehicle.

* * * * *